United States Patent [19]

Turetta

[11] Patent Number: 5,491,423
[45] Date of Patent: Feb. 13, 1996

[54] DEVICE FOR DETECTING THE PRESENCE OF A FOOD CONTAINER, SUCH AS A SAUCEPAN, DISH OR THE LIKE, ON A GLASS CERAMIC COOKING HOB

[75] Inventor: Daniele Turetta, Ispra, Italy

[73] Assignee: Whirlpool Europe B.V., Veldhoven, Netherlands

[21] Appl. No.: 212,525

[22] Filed: Mar. 11, 1994

[30] Foreign Application Priority Data

Mar. 15, 1993 [IT] Italy ................... MI93A0494

[51] Int. Cl.$^6$ .................................................. G01R 27/26
[52] U.S. Cl. .................. 324/663; 324/686; 219/448; 219/452; 340/825.06; 99/331
[58] Field of Search .................. 324/658, 663, 324/671, 686, 687, 688, 690; 340/825.06; 219/448, 451, 452; 99/331, 326; 126/39 BA

[56] References Cited

U.S. PATENT DOCUMENTS

| | | | |
|---|---|---|---|
| 3,406,802 | 10/1968 | Needham et al. | 324/688 X |
| 4,016,490 | 4/1977 | Weckenmann et al. | 324/688 X |
| 4,099,118 | 7/1978 | Franklin et al. | 324/671 |
| 4,887,024 | 12/1989 | Sugiyama et al. | 324/690 X |
| 5,136,277 | 8/1992 | Civanelli et al. | 219/452 X |
| 5,166,679 | 11/1992 | Vranish et al. | 324/687 X |
| 5,243,172 | 9/1993 | Hazan et al. | 219/448 X |
| 5,296,682 | 3/1994 | Wittauer et al. | 219/451 X |
| 5,424,512 | 6/1995 | Turetta et al. | 219/452 X |

FOREIGN PATENT DOCUMENTS

| | | | |
|---|---|---|---|
| 2831858 | 2/1980 | European Pat. Off. | H05B 3/74 |
| 3711589 | 10/1988 | European Pat. Off. | F24C 7/08 |
| 0374868 | 6/1990 | European Pat. Off. | H05B 3/68 |
| 3934157 | 4/1991 | European Pat. Off. | H05B 3/68 |
| 0429120 | 5/1991 | European Pat. Off. | F24C 15/10 |
| 0478081 | 4/1992 | European Pat. Off. | G05D 23/19 |

*Primary Examiner*—Kenneth A. Wieder
*Assistant Examiner*—Glenn W. Brown
*Attorney, Agent, or Firm*—Robert O. Rice; Thomas A. Schwyn; Mark A. Davis

[57] ABSTRACT

A device for detecting the presence of a food container such as a saucepan dish or the like, placed on a heating element of a glass ceramic cooking hob comprising electrical conductor rings fed with signals which are identical but of opposite phase, between the conductor rings there being interposed a detector ring traversed by electrical signals, the conductor and detector rings being positioned in correspondence with that cooking region of the glass ceramic hob where the heating element is positioned, the signals from the detector ring varying on the basis of the presence or absence of the food container on the hob, a control being provided to measure the variation in the electrical signals and to intervene in the operation of the heating element.

5 Claims, 5 Drawing Sheets

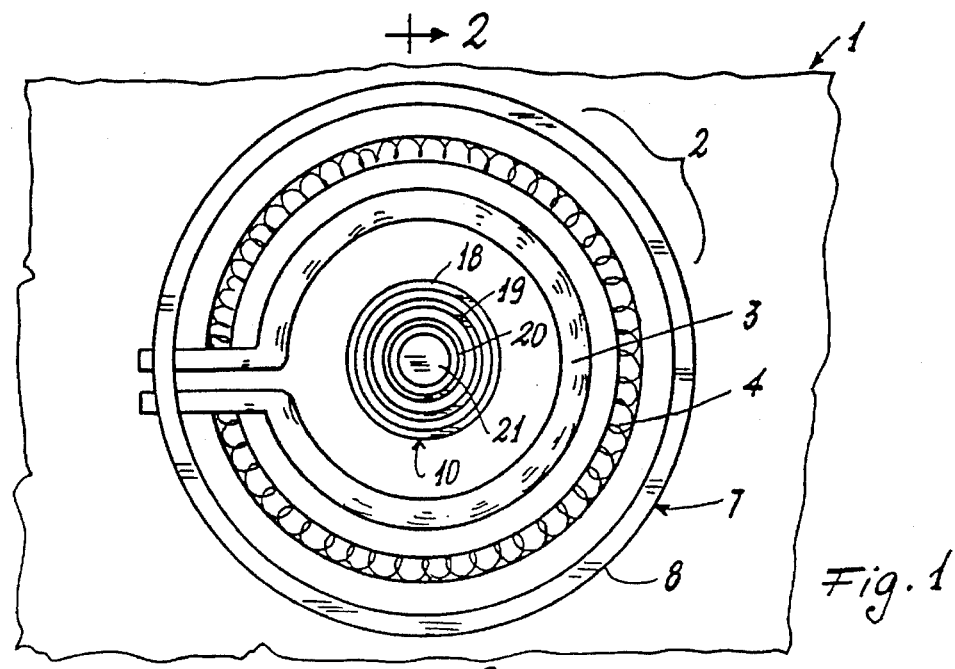
Fig. 1
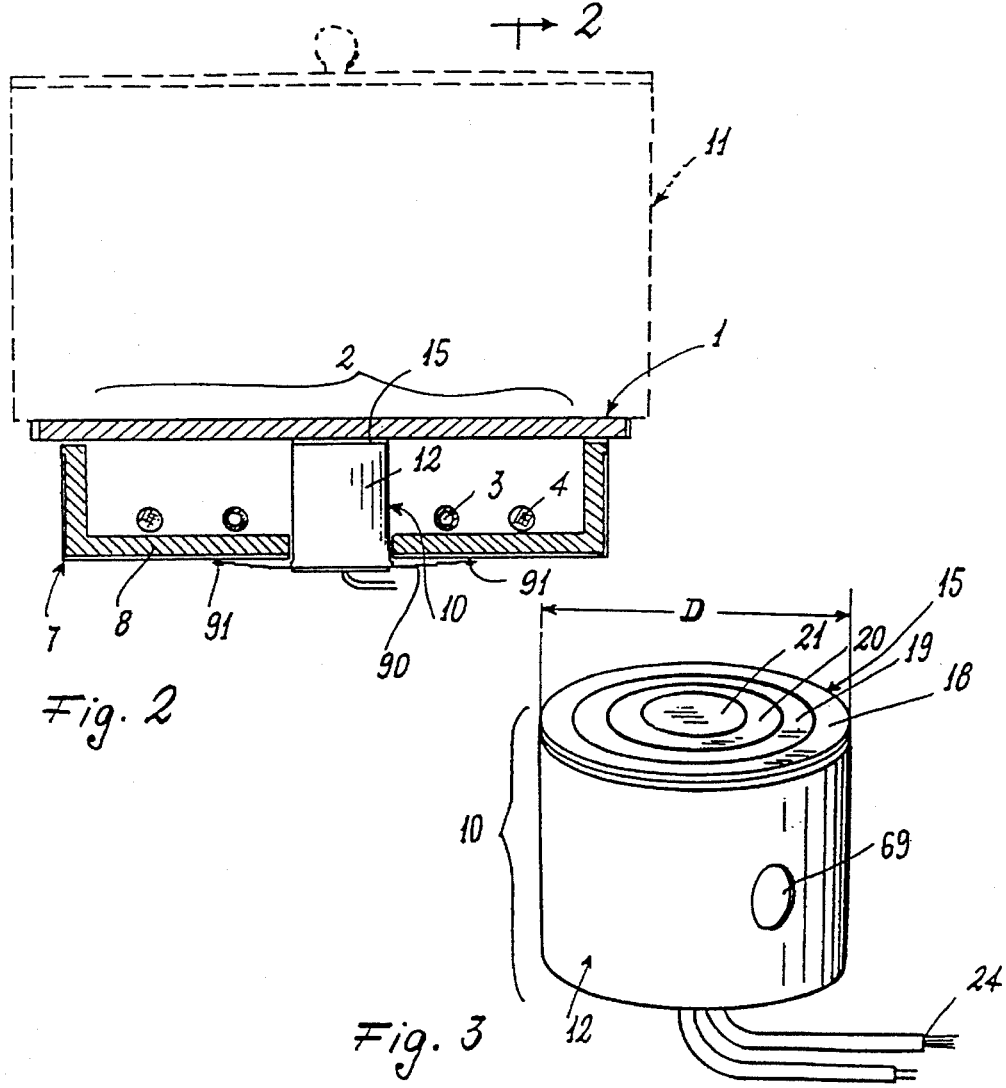
Fig. 2
Fig. 3

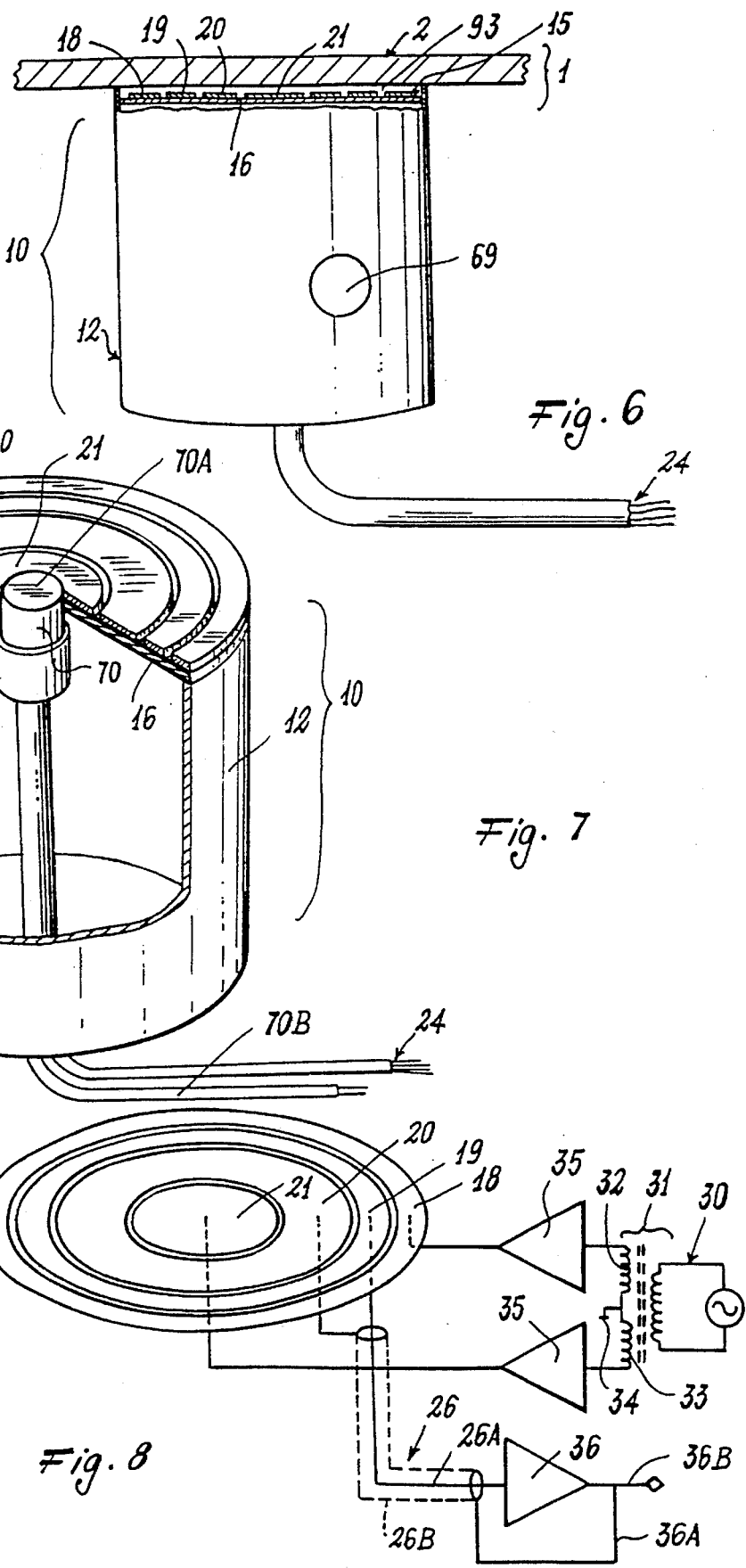

DEVICE FOR DETECTING THE PRESENCE OF A FOOD CONTAINER, SUCH AS A SAUCEPAN, DISH OR THE LIKE, ON A GLASS CERAMIC COOKING HOB

This invention relates to device for detecting the presence of a food container such as a saucepan, dish or the like, placed on a cooking region of a hob of glass ceramic or similar material, below which there is positioned in correspondence with the cooking region at least one usual heating element or heat source such as a resistance element, a gas burner, a halogen lamp or the like.

Devices are known for detecting the presence of a container on the cooking region of a glass ceramic hob plate, for the purpose of controlling the operation of the heating element.

In one of these devices, two elements acting as capacitor plates are provided below said hob plate or silk-screen printed onto it in the cooking region, to define a "capacitive sensor" able to detect the presence of the container in said region by a variation in the capacitance of the capacitor on placing the container on said glass ceramic hob plate. However, the detecting efficiency of this known device varies with increasing temperature of the cooking region. Specifically, above 150° C. the reliability of the device decreases, until above 300° C. it becomes totally unreliable. This is because the conductivity of the glass ceramic hob plate increases with increasing temperature, this conductivity falsifying the data obtained from the capacitive sensor.

In addition associating the plate elements of the "capacitive sensor" with the cooking hob involves a cost which negatively affects the cost of the finished product.

An object of the present invention is to provide a device for detecting the presence of a food container on the cooking region which is reliable and is independent of the temperature reached by said region during food preparation.

A further object is to provide a device which is of safe use for the user and results in considerable energy saving during the use of the glass ceramic cooking hob.

A further object is to provide a device of the aforestated type which is of simple, low-cost construction.

A further object is to provide a device which, when the food container is placed on a given cooking region, indicates which knob the user must operate in order to activate the heating element of that particular region.

A further object is to provide a device by which the power of the heating element is automatically reduced when the container is removed from the corresponding cooking region, this power being automatically zeroed if the container is not returned to said region within a given time. This results in considerable energy saving and limits the annoying luminosity of this region which occurs when the heating element below it is powered without the container being present on it.

These and further objects apparent to the expert of the art are attained by a device as described in the characterising part of the independent claim.

The present invention will be more apparent from the accompanying drawings, which are provided by way of non-limiting example and in which:

FIG. 1 is a plan view of a cooking region of a glass ceramic cooking hob with which the device of the invention is associated;

FIG. 2 is a section on the line 2—2 of FIG. 1;

FIG. 3 is an enlarged perspective view of one embodiment of a part of the device according to the invention;

FIG. 6 is a side view of a modification of that part of the device shown in FIG. 3;

FIG. 7 is a cut-away view of a further modification of the part shown in FIG. 3;

FIG. 8 is an example of a schematic circuit for a part of the device of FIG. 5.

Figure 4:
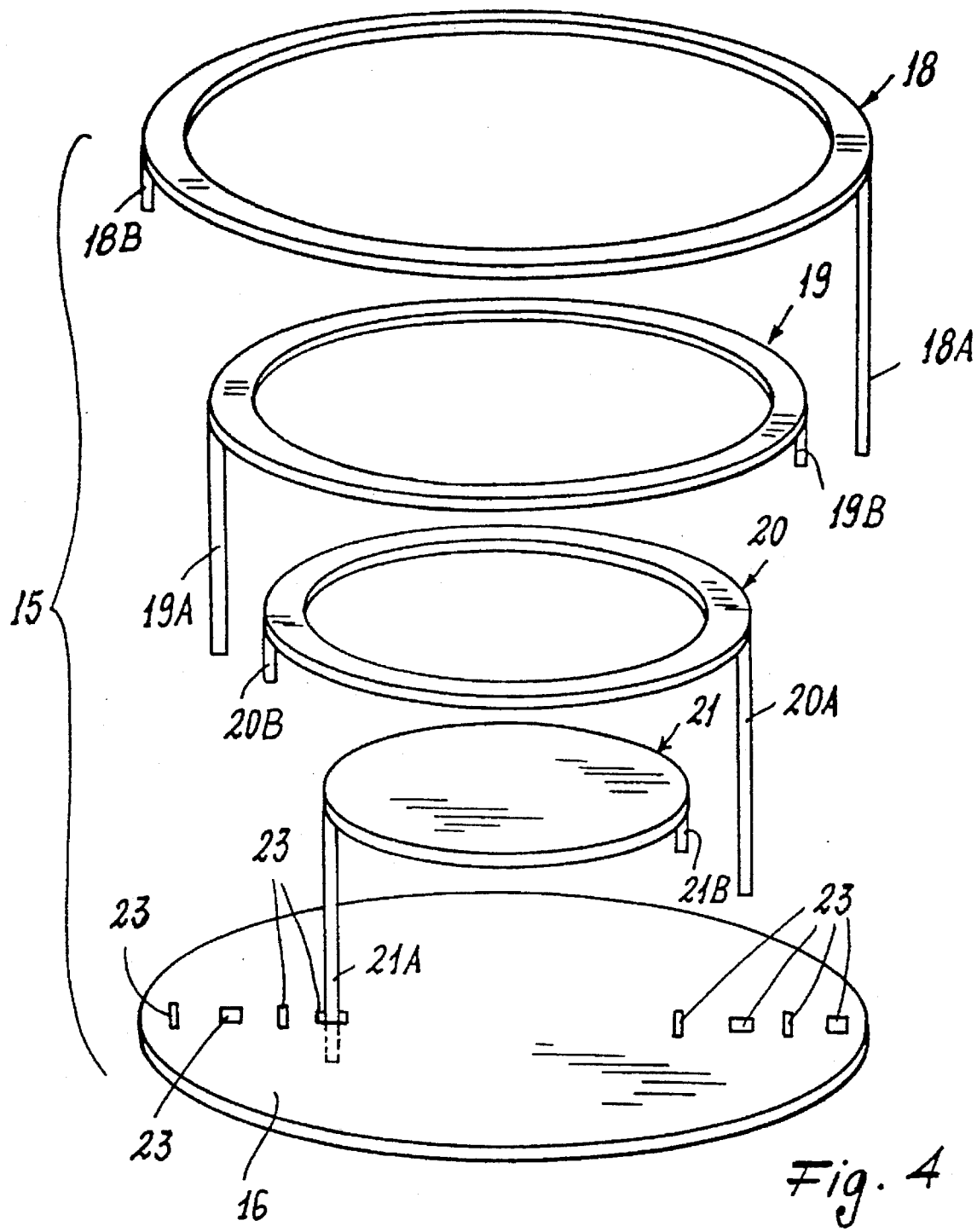
FIG. 4 is an exploded view of a portion of that part of the device shown in FIG. 3.
Figure 5:
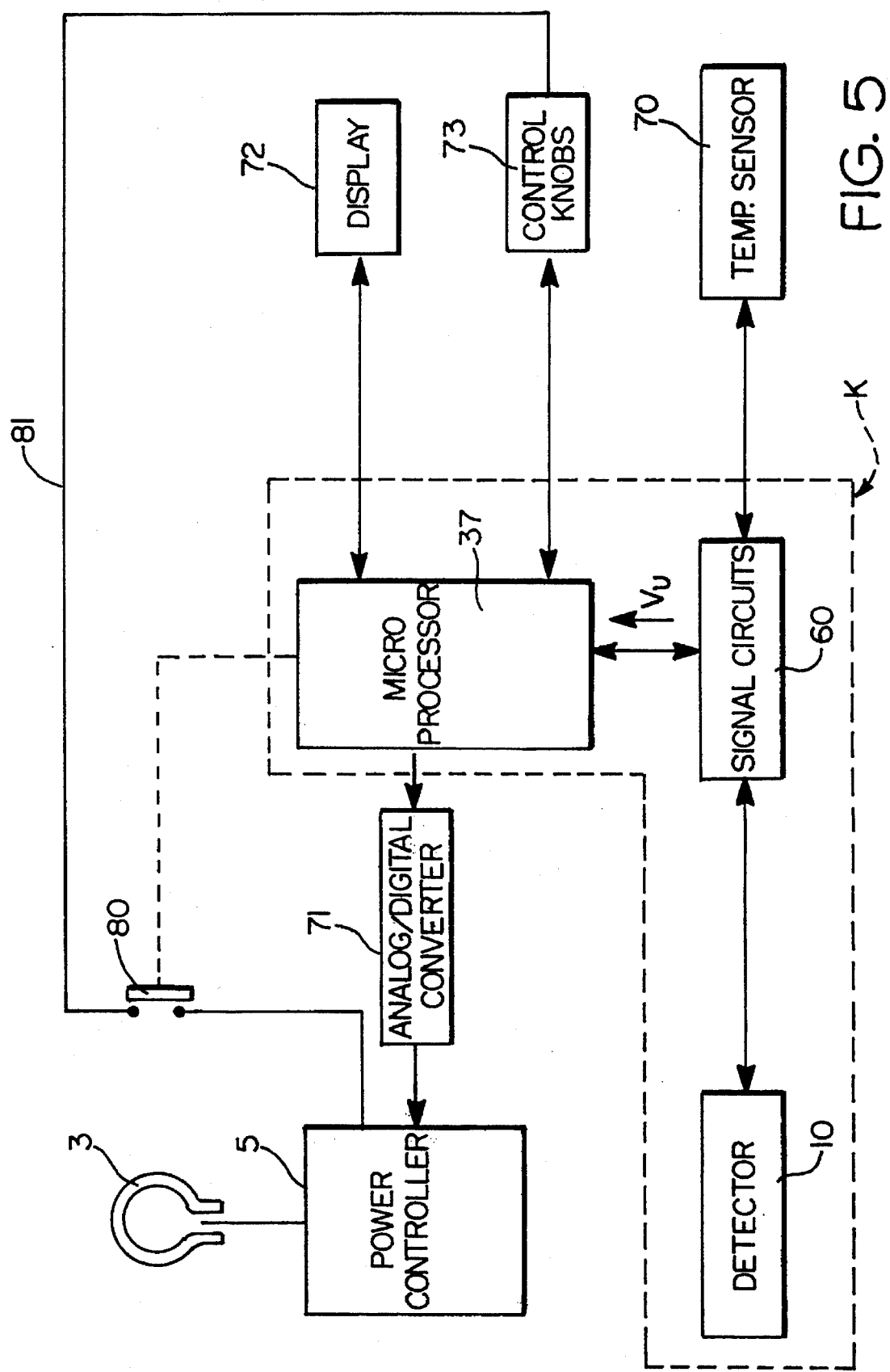
FIG. 5 is a block diagram of the device of the invention connected to usual members of the cooking hob.

With reference to FIGS. 1 to 5, a glass ceramic cooking hob is indicated overall by 1 and comprises a plurality of cooking regions 2 (only one of which is shown in FIGS. 1 and 2) in which at least one usual heating element is provided, In the example under consideration, a usual halogen lamp 3 and a resistance element 4 are provided in said region 2, the halogen lamp being powered (or not, as the case may be) via a usual power controller of known type, indicated by 5 in FIG. 5. Said heating elements 3 and 4 are associated with a usual support 7 comprising thermally insulating walls 8 (see FIGS. 1 and 2).

A part of the device of the invention, namely a member 10 for detecting the presence of a food container (such as a metal saucepan, a glass or ceramic dish or the like) on the region 2, is associated with the support 7. The member 10 comprises a cylindrical body 12 with a base diameter D (see FIG. 3) considerably smaller than the dimensions of the container or saucepan 11 lying on the region 2 (which in known manner depends on the dimensions of region 2). This results in considerable precision in detecting the presence of the saucepan as this detection is not influenced by the glass ceramic interposed between the member 10 and the saucepan 11.

More specifically, the said body 12, constructed of light material such as aluminium, of the detecting member comprises an upper sensing part 15 defined by a metal layer 16 (for example of aluminium) with which a plurality of conducting elements 18, 19, 20 and 21 are associated (these will be defined hereinafter, although the last of them is a disc element in the drawings under examination). Said elements are shown in the example as endless rings provided with projections or stems 18A, B, 19A, B, 20A, B and 21A, B housed in corresponding slots 23 in the layer 16. Usual electrical connection cables 24 are connected to the projections on the elements 18 to 21 to feed electrical signals (such as a voltage) to the elements.

Said projections pass beyond the layer 16 and then project away from the cooking hob 1. This allows simple connection to the relative cables 24 and enables the connection points to be distant from the cooking hob 1 and protected by the layer 16, with consequent thermal protection of the connections.

The elements 18, 19, 20 and 21 can however be in the form of broken rings, or straight or curved elements placed side by side.

The most outer ring 18 and the most inner ring 21 define the plates of a flat capacitor and are fed with sinusoidal signals of identical form, amplitude and frequency, but phase-displaced by 180°. This feed creates an electrical (and magnetic) field which starts from one ring and closes onto the other.

The rings 19 and 20 lie between the rings 18 and 21. The ring 19 acts as the sensor ring and the ring 20 as the guard electrode the purpose of which is to compensate for any sensing errors by the ring 19 due to the provision of a coaxial electric cable 26 which withdraws an electrical signal from said ring 19 and feeds it to a circuit portion for analysis of the data obtained by the circuit portion (see FIG. 8).

The feed to the rings 19 and 20 and data withdrawal from the ring 19 will now be described in greater detail with reference to FIGS. 8, 9 and 10.

The device of the invention comprises (FIG. 8) an oscillator 30 connected to a transformer 31 having two secondary branches 32 and 33, connected at one end to earth at 34 and at their other end to high output impedance members such as buffers 35. These latter are connected to the rings 18 and 21.

The rings 19 and 20 are connected to an electrical member of high input impedance such as a buffer or emitter follower 36. This latter generates an output which is fed to a control unit such as a microprocessor circuit 37 (shown in FIG. 5) the use of which is described hereinafter. The connection to the buffer 36 is via said coaxial cable, in which the usual central element 26A is connected to the ring 19 and the sheathing 26B is connected to the ring 20. A feedback branch 36A connects the output 36B of the buffer 36 to the sheathing 26B of said cable 26.

Figure 9:
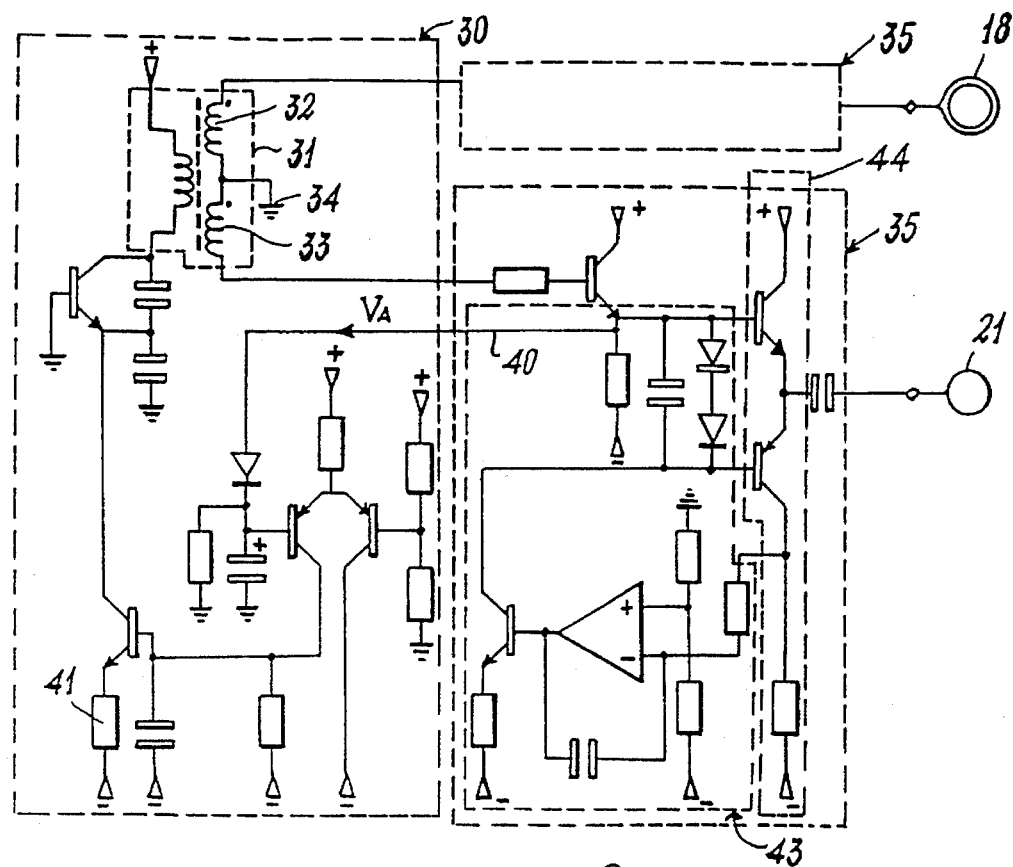
FIGS. 9 and 10 are two different circuit arrangements for parts of the schematic circuit of Finite 8, the components of these circuit parts being known to the expert of the art, and are therefore not described in detail hereinafter.

FIG. 9 shows that circuit part which feeds the rings 18 and 21 of the member 10. In this figure, parts corresponding to those of the already described figures are indicated by the same reference numerals.

As can be seen, the oscillator 30 is a usual Colpetts oscillator and is connected to the two buffers 35 which are identical (and hence only one is shown completely) except for the presence of a return branch 40 from the buffer 35 to the oscillator 30, and connected to the ring 21. A signal $V_A$ returns to the oscillator via the branch 40, in order, by means of a resistor associated with this latter, to control the amplitude of the signal fed to the buffers 35.

Each buffer 35 also comprises a constant current generator 43 and a phase-opposition amplifier 44 (ie of push-pull type).

The oscillator 30 and the buffers 35 also comprise other usual circuit components and connections (shown) the characteristics and use of which are apparent to the average expert of the art. The members 30 and 35 are therefore not further described.

Figure 10:
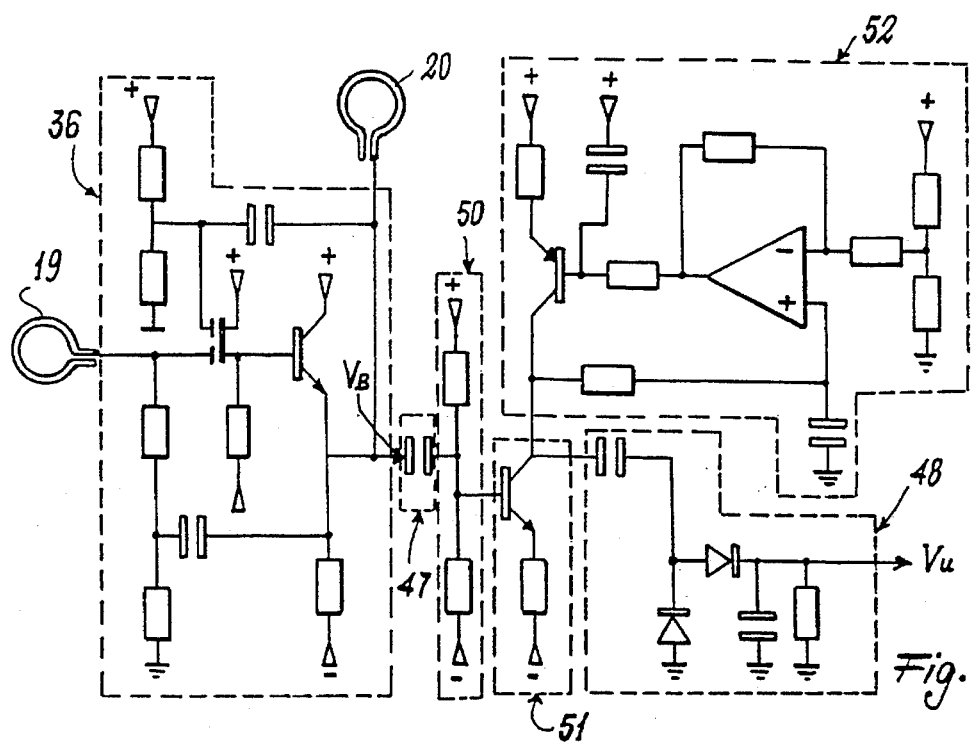

FIG. 10 shows the circuit part corresponding to one embodiment of the components for receiving and processing the signals from the ring 19. In this figure, parts already described in relation to the preceding figures are indicated by the same reference numerals.

The circuit part under examination comprises the buffer 36, and a decoupling stage 47 (defined by a capacitor) to allow passage of the alternating component of a signal VB generated by the buffer, to an alternating current rectifier 48.

The signal $V_B$ is firstly connected to a direct current source 50, then amplified by an amplifier 51 and then connected to a second direct current source 52.

The use of the rectifier 48 enables a continuous signal $V_U$ to be obtained at the output of the circuit part of FIG. 10, to be then fed to the unit 37 of FIG. 5. The use of the current rectifier 48 also limits losses of the signal withdrawn from the ring 19 and enables it to be fed virtually totally to the unit 37 for reliable control of the utilization and operation of the cooking hob 1.

The components shown in the circuit part of FIG. 10 are of known type and their connection is such as to enable an average expert of the art to understand their use. These components are therefore not further described.

The circuit parts of FIGS. 8, 9 and 10 are grouped into the block 60 of Finite 5, connected to the member 10 and to the unit 37. These latter define the device K of the invention.

As can be seen from said FIG. 5, the block 60 also receives signals from another block representing a usual temperature sensor 70 for measuring the temperature of the heating elements and for protecting their integrity in known manner. This sensor passes through a hole 69 in the body 12 of the member 10.

The unit 37 is also connected, via an analog/digital converter 71, to said power controller 5, to a display 72 and to the usual knobs 73 for for operating the heating elements of the cooking hob.

It will now be assumed that the cooking hob 1 is to be used by placing a saucepan 11 on the region 2. It will also be assumed that alternating electrical signals are fed to the rings 18 and 21 as described heretofore so that an electrical (and magnetic) field exists between them.

Under these conditions, before the saucepan is placed on the cooking hob 1, the ring 19 (and the ring 20) are traversed by an electrical signal generated by induction by the said electrical (and magnetic) field. This signal is withdrawn via the cable 26 and fed to the buffer 36. At the output of this latter there is a sinusoidal signal of the same phase and frequency as the signal present in the ring 18 and with an amplitude which is considered as the reference amplitude by the unit 37 to which this signal is fed. However, said amplitude is different from that of the signal present in the ring 18. This is because of the normal losses present in the sensor material and because of the influence of the cables 24 and 26 connected to the rings 18, 19, 20 and 21.

When the saucepan 11 is placed on the hob 1, its presence modifies the electrical field generated by the rings 18 and 21 (for example because of the variation in the dielectric present between them, which now comprises the saucepan material).

This variation results in a variation in the signal withdrawn from the ring 19, with a consequent variation in the amplitude of the output signal from the buffer 36.

This amplitude variation is amplified and then transformed by the rectifier 48 of FIG. 10 into a different signal $V_U$ (from that generated in the absence of the saucepan 11), fed by the block 60 of FIG. 5 to the unit 37. This latter measures the difference between the signal $V_U$ and the reference signal previously measured (and preferably memorized in a suitable memory area of the unit 37, not shown) in the absence of the saucepan 11, and feeds a signal to the display 72 which, in any known manner, displays the presence of the saucepan on the region 2. Preferably a display (such as a light element) is associated with each knob, and if activated tells the user which knob to use in order to activate the heating element corresponding to that region 2 on which the saucepan is present.

As an alternative to that described, the unit 37 detects the presence of the saucepan 11 when the signal $V_U$ varies suddenly (ie within a predetermined short time interval), said unit therefore detecting independently of comparisons with predetermined reference values. This means that the device does not need to be calibrated before being used on the cooking hob 1.

The unit 37 can also enable the operation of the knob in any known manner, for example by closing an electrical contact 80 provided in an electrical branch 81 connecting the knob to the power controller for the corresponding heating element.

Under said conditions, the food in the saucepan 11 can be subjected to heat.

If the saucepan is removed from the region 2, the signal $V_U$ returns to that previously measured by the unit 37 in the initial situation (saucepan 11 not on the region 2). Consequently, the unit 37 causes the power controller 5 to make the heating element operate at minimum power, and if the saucepan is not returned to the region 2 within a predetermined time period (for example one minute), measured by a usual clock (not shown), the unit 37 switches off the heating element.

The aforegoing can be achieved with a heating element of any type (halogen lamp, electrical resistor or gas burner). The power controller 5 must be of a suitable type for the particular type heating element used, such as a solenoid valve (in the case of gas) or a potentiometer (in the case of an electrical resistor), or a usual halogen lamp controller.

With regard to said member 10, this is connected to the support 7 via an elastic metal strip 90 (see FIG. 2) fixed to said support by usual screws 91. Specifically, the body 12 of said member is inserted through a through hole 7A in said support and is urged against and maintained in contact with the hob 1 by the elastic strip 90 so as to bring the rings 18, 19, 20 and 21 into contact with said hob.

In a modified embodiment of the device, shown in FIG. 6 (in which parts corresponding to those of the previously described figures are indicated by the same reference numerals), said rings are arranged in a cavity 93 provided in the part 15 of the body 12 of the member 10, and are separated from the hob 1. This prevents signals sensed by the ring 19 being disturbed by the electrical "noise" generated by the heating elements and/or by the power controller 5 corrected to them. Hence with the modification of FIG. 6 the signals taken from the ring 19 are more easily distinguishable from said noise, hence achieving greater reliability in detecting the presence of the saucepan on the region 2.

FIG. 7, in which parts corresponding to those of the previously described figures are indicated by the same reference numerals, shows a further embodiment of the invention. In this, the temperature sensor 70 is positioned within the body 12 of the member 10, with its usual sensitive part 70A in a central region of the ring 21 and inserted through a hole therein (not shown) so as to make contact with the cooking hob 1. An electric cable 70B feeds the signal from the sensor 70 to the outside of the body 12 of the member 10.

The use of the modified embodiments of FIGS. 6 and 7 is identical to that previously described in relation to FIGS. 1 to 5 and 8 to 10, and will therefore not be repeated.

Some particular embodiments of the invention have been described. Further embodiments are possible in the light of the described teachings (such as in relation to the circuit parts of FIGS. 9 and 10, which can be modified by the expert of the art on the basis of the result to be obtained and his particular knowledge), and which fall within the scope of the present document.

I claim:

1. A device for detecting the presence of a food container, placed on a cooking region of a hob of glass ceramic, below which there is positioned in correspondence with this region at least one heating element, said device comprising detection means positioned in correspondence with said cooking region below the glass ceramic hob and interposed between conductor means through which first electrical signals flow, said detection means generating second electrical signals at least one characteristic of which varies on the basis of the presence or absence of the container on said region, said second electrical signals being fed to heating element control means which, on the basis of the variation in the aforesaid characteristic, at least partly modify the state of activation of said heating element;

the detection means and conductors are elements arranged side by side on a support member positioned below the cooking region;

the elements on the support member are concentric annular elements, the most outer and most inner element being fed electrically by feed means, the detection means including an intermediate ring acting as a sensor member, said outer and inner annular elements defining a flat capacitor; and the feed means are an oscillating voltage generator member, which is connected to a transformer member having two secondary windings connected at a common end to earth and at each other end to electrical means of high output impedance, said electrical means being connected to the outer annular element and to the inner annular element respectively, said outer and inner annular elements being fed with electrical signals which are identical except for one characteristic.

2. A device as claimed in claim 1, wherein the signals fed to the outer and inner annular elements are of different amplitude.

3. A device as claimed in claim 1, wherein the detection means are connected to electrical means having high input impedance, said electrical means being connected to rectifier means for generating a continuous signal transmitted to the control means.

4. A device as claimed in claim 3, wherein the rectifier means are an alternating current rectifier.

5. A device for detecting the presence of a food container, placed on a cooking region of a hob of glass ceramic, below which there is positioned in correspondence with this region at least one heating element, said device comprising detection means positioned in correspondence with said cooking region below the glass ceramic hob and interposed between conductor means through which first electrical signals flow, said detection means generating second electrical signals at least one characteristic of which varies on the basis of the presence or absence of the container on said region, said second electrical signals being fed to heating element control means which, on the basis of the variation in the aforesaid characteristic, at least partly modify the state of activation of said heating element;

a second conductor means arranged to provide reference signals for comparison with the second electrical signals originating from the detection means;

the second conductor means is an annular element interposed between the detection means and the most outer element of the first conductor means;

the second conductor means for generating reference signals are connected to a feedback branch provided in an electrical means having high input impedance to which the detection means are connected.

* * * * *